United States Patent
Long et al.

(10) Patent No.: US 7,745,759 B2
(45) Date of Patent: Jun. 29, 2010

(54) APPARATUS FOR BREWING BEVERAGES

(75) Inventors: Tom Long, Hockessin, DE (US); Daniel D. Friel, Sr., Greenville, DE (US); Daniel D. Friel, Jr., Kennett Square, PA (US); James M. Fitzgerald, West Chester, PA (US); H. William Busch, Jr., Wilmington, DE (US)

(73) Assignee: Edgecraft Corporation, Avondale, PA (US)

( * ) Notice: Subject to any disclaimer, the term of this patent is extended or adjusted under 35 U.S.C. 154(b) by 97 days.

(21) Appl. No.: 11/842,367

(22) Filed: Aug. 21, 2007

(65) Prior Publication Data

US 2007/0278202 A1 Dec. 6, 2007

Related U.S. Application Data

(63) Continuation-in-part of application No. 10/774,329, filed on Feb. 5, 2004, now Pat. No. 7,279,660.

(60) Provisional application No. 60/445,370, filed on Feb. 6, 2003.

(51) Int. Cl.
*H05B 3/00* (2006.01)
*A47J 31/20* (2006.01)

(52) U.S. Cl. .................. 219/214; 219/497; 219/490; 219/491; 219/492; 219/505; 219/501; 219/494; 99/297; 99/299; 99/287; 99/283; 99/319; 99/318; 99/295; 426/43

(58) Field of Classification Search ................ 219/214, 219/497, 490–492, 505, 501, 494; 99/297, 99/299, 287, 283, 319, 318, 295; 426/433
See application file for complete search history.

(56) References Cited

U.S. PATENT DOCUMENTS

| 3,279,351 A | | 10/1966 | Cohn |
| 4,401,014 A | | 8/1983 | McGrail |
| 4,544,830 A | | 10/1985 | Miller |
| 5,862,738 A | | 1/1999 | Warne |
| 6,135,010 A | * | 10/2000 | Husted et al. ............ 99/319 |
| 6,240,833 B1 | | 6/2001 | Sham et al. |

FOREIGN PATENT DOCUMENTS

| DE | 197 06 523 | | 8/1998 |
| EP | 1767128 | * | 3/2007 |
| WO | WO 00/40128 | | 7/2000 |
| WO | WO 01/28294 | | 4/2001 |

* cited by examiner

*Primary Examiner*—Shawntina Fuqua
(74) *Attorney, Agent, or Firm*—Connolly Bove Lodge & Hutz

(57) ABSTRACT

An electrically heated water kettle comprises a vessel for holding a liquid for extraction of tea, coffee or other food material. The vessel includes a partially open immersible container sized to allow the passage of water between the walls of the vessel. The container is capable of holding the material while an opening in the container allows the entrance of water into the container upon immersion of the container in the water. The heated kettle incorporates structure to hold the container out of the water until the water reaches an appropriate extraction temperature and to immerse or withdraw the container into or from the water as is necessary to accomplish the extraction.

29 Claims, 6 Drawing Sheets

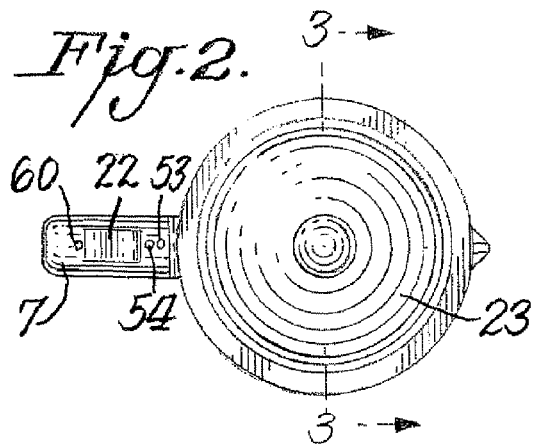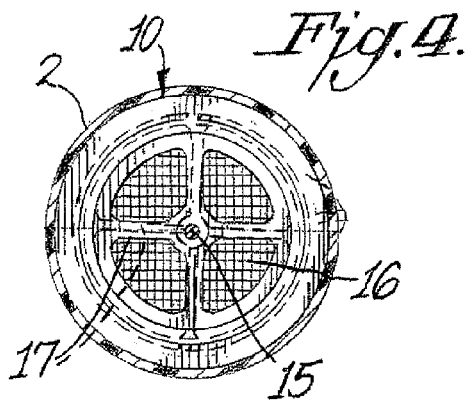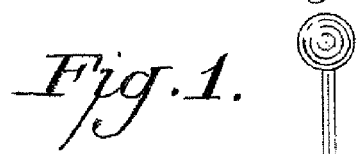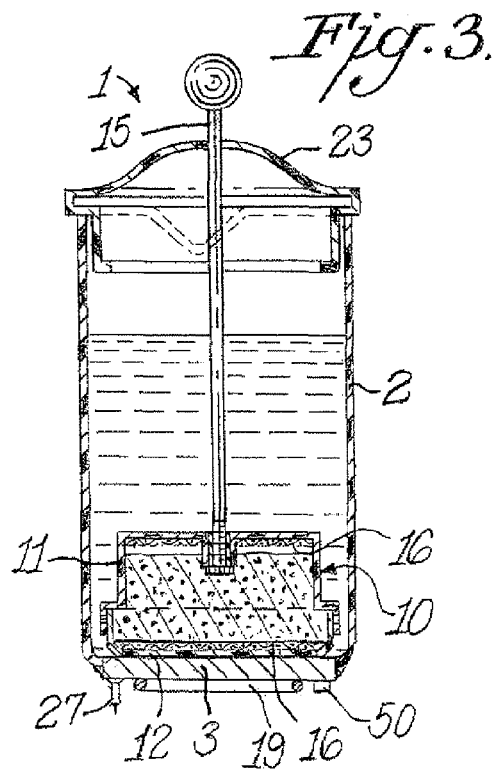

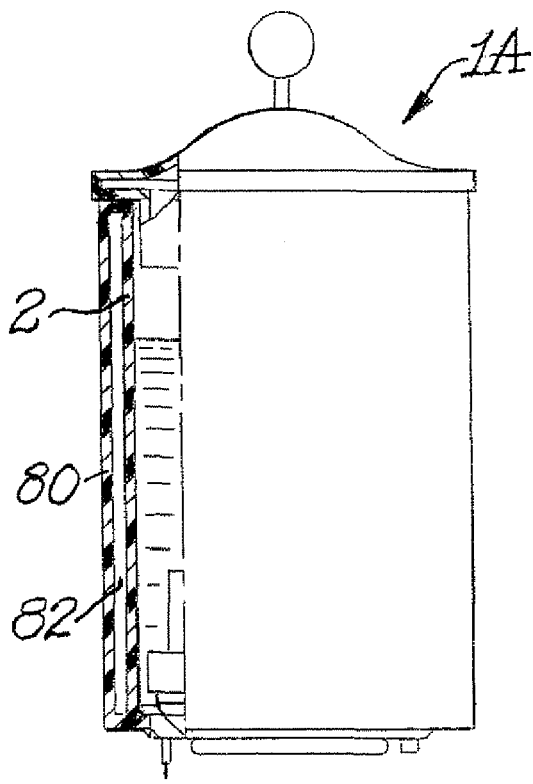
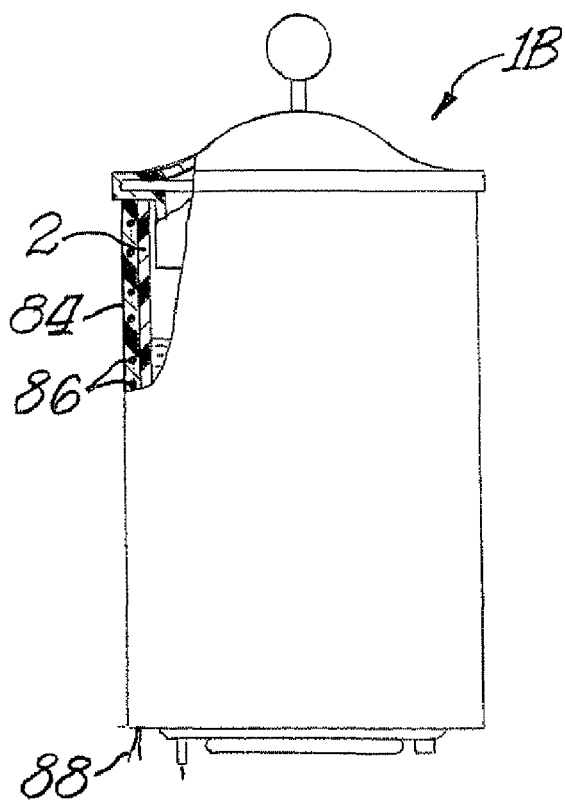

US 7,745,759 B2

APPARATUS FOR BREWING BEVERAGES

CROSS-REFERENCE TO RELATED APPLICATIONS

This application a continuation-in-part of U.S. application Ser. No. 10/774,329, filed Feb. 5, 2004 now U.S. Pat. No. 7,279,660 which is based on provisional application Ser. No. 60/445,370, filed Feb. 6, 2003, all of the details of which are incorporated herein by reference thereto.

BACKGROUND OF THE INVENTION

A wide range of means have been disclosed for the brewing of tea and coffee including percolators, drip methods, and french press. The french press is among the most effective means for extracting the best flavors from tea leaves and ground coffee. The most common french presses are non electric and depend upon preheating the water by conventional means and transferring the hot water to a french press for extraction of the tea leaves or coffee. The electric french press is a similar means to prepare such beverages that boils the water directly in the kettle to insure that the water is at boiling temperature at the start of the brewing cycle.

A conventional electric french press type kettle such as described in PCT WO 00/40128 and (PCT/EP99/10357) (DE 19706523A1) is a glass or plastic water vessel with an electric heater plate which is in contact with the water. In such prior art, electrical connection to the kettle and the heater is commonly made through a detachable supporting base that contains an electrical connector which inserts into an electrical socket on the underside of the base enclosure of the kettle. It is common also for the kettle to have a handle on which there is a steam actuated electrical switch that will interrupt all power to the heater plate whenever the water boils and generates steam. However, these conventional brewing devices lack versatility, lack sufficiently precise control of the water temperature during the actual brewing process and have other limitations found to be objectionable by the serious consumer of these beverages.

SUMMARY OF THE INVENTION

This invention is an advanced electric brewing kettle that provides means for adjusting the water temperature precisely to any value for optimum extraction of a wide variety of coffees and teas. The optimum temperatures for extracting green teas is much lower than the black teas. Coffees are generally best extracted at a particular temperature just below the boiling point of water, selected for a favorite coffee and personal tastes. The improved apparatus described here is designed so that the user can operate it either similarly to a French press or as an improved extractor that allows the coffee, tea or other extractable food to be preheated and steamed before the liquid extraction takes place.

This invention incorporates an improved means of containing the tea leaves or ground coffee during the extraction and steeping process. By this novel means the contained tea or coffee can be immersed in the water exactly at the optimum brewing temperature and can be removed completely from the water after the precisely optimum steeping or brewing time, thereby stopping abruptly any further extraction. By stopping extraction the more bitter ingredients in the tea leaves or coffee grounds are not extracted and mixed with the more flavorful flavorants already extracted into the water. Further the opportunity for any of the fine grinds from the coffee or tea to remain in the extracted tea or coffee is virtually eliminated unlike the situation with french presses where the extracted fragments of the tea or coffee remain in the kettle as the beverage is poured. These conventional means aversely affect taste of the beverage and allows unfiltered solids to be poured with the liquid.

An added advantage provided by this novel means is that the ground coffee or tea leaves confined within a semi-open container can remain in the kettle above the water level during the time that the water is being heated—thereby allowing the steam to penetrate and swell the tea leaves or ground coffee before they are immersed in the water for extraction. This swelling process or "blooming" allows the extraction time during immersions to be more efficient and shortens the extraction time.

Unique, electrical and electric means provide ability to precisely control the extraction time and the extraction temperature, and to adjust operating procedures to adapt to changes in the boiling point due to localized atmospheric pressure especially at higher elevations.

THE DRAWINGS

FIG. 1 is a side elevational view partially broken away of an apparatus for brewing beverages in accordance with this invention;

FIG. 2 is a top plan view of the apparatus shown in FIG. 1;

FIG. 3 is a cross-sectional view taken through FIG. 1 along the line 3-3;

FIG. 4 is a cross-sectional top plan view of a beverage container used in the apparatus of FIGS. 1-3;

FIGS. 15-16 are side elevational views partly in section of further embodiments of this invention.

DETAILED DESCRIPTION

Figure 5:
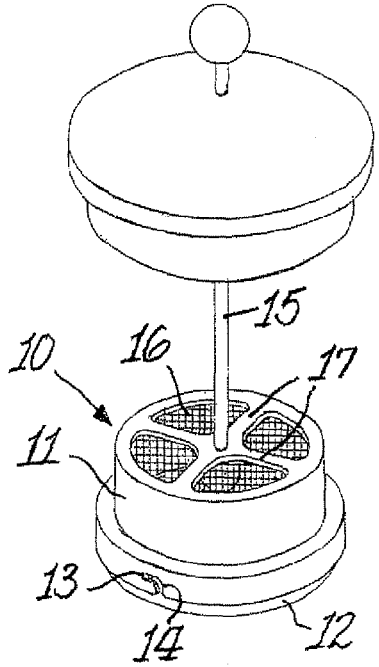
FIG. 5 is a perspective view of the container system used in the apparatus of FIGS. 1-4.

An improvement of this invention is a unique container system which can hold ground coffee or tea leaves within the kettle but out of the water until it is heated to the optimum temperature. FIG. 1 shows an electrically heated kettle 1 with a glass or plastic shell vessel 2, a handle 7 with one or more control switches 55 and LEDs 53, 54 and 60 mounted on the handle. The unique container system 10 is supported above the liquid on the lower end of control rod 15 which passes thru the kettle cover 23. The container can be lowered manually or in alternative models by an automated means beneath the surface of the water in the kettle during the extraction cycle.

An electric heater plate 3 is attached to the bottom of the kettle shell 2. Preferably the heater plate 3 forms the bottom of the kettle being sealed to the kettle in a manner that insures that one side of plate 3 is in direct contact with the water. Attached to the bottom of the heater plate 3 is an electrically powered heater 19. Power applied to this heater is controlled by a uniquely programmed electronic processor and controller. Temperature of the water is measured by a thermocouple, thermistor 27 or similar temperature sensor that plugs into processor 47 mounted in enclosure 6. The temperature sensor 27 is mounted either in direct contact with the heated water, the kettle shell or under the lower heater plate 3 which in turn remains in intimate contact with the heated water The entire apparatus is powered thru power cord 25 connected through base 4 in which is mounted a cordless connector of a type similar to that commercially available from Otter, Strix and other suppliers. Power to the kettle itself is passed through this connector by a plug 29 extending from the base 4 that goes into socket 30 attached to the base of the heater plate 3 in the enclosure 6 which supports the kettle and serves to enclose certain electrical components mounted under the kettle and the heater plate 3. While a cordless kettle is generally preferred, the kettle can be connected directly by means of a power cord to the local household power outlets.

The filled food container 10 can be immersed in the heated water at the beginning of the extraction process and held there for the extraction cycle. At that time the container 10 can be raised above the heated liquid in order to abruptly terminate the extraction process. The container while in the water can be held in one position or if desired it can be moved up and down manually or mechanically in order to enhance the flow of water through the container providing better contact with the tea leaves or ground coffee in order to enhance the extraction efficiency or to achieve a different type of extraction and taste balance.

Figure 8:
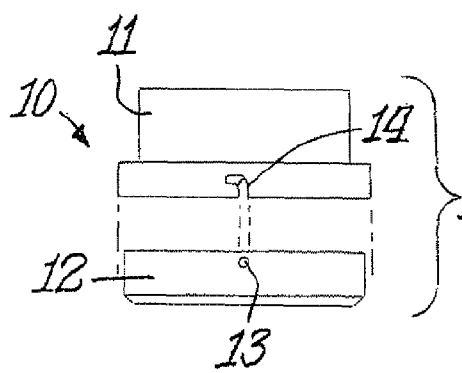
FIG. 8 is an exploded side elevational view showing the upper cover section for the lower basket section of the apparatus shown in FIGS. 1-5.

Container system 10 (FIG. 3) consists of an upper section 11 (FIGS. 5 and 8) to which is attached a lower basket section 12 that holds the tea leaves or ground coffee. The lower basket section 12 is attached to the upper section 11 by aligning the pins on the lower basket 12 to the slots in the upper section 1, inserting the basket 12 into the upper section and rotating the lower section 12 to secure its position. The lower section 12 can be removed from the upper section 11 even while upper section 11 remains attached to rod 15.

Figure 6:
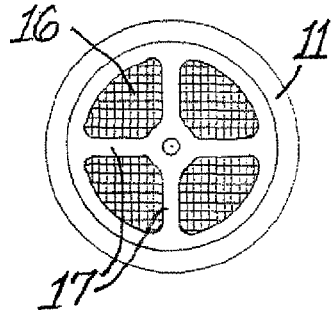
FIG. 6 is a top plan view of the upper cover section of the apparatus shown in FIGS. 1-5.
Figure 7:
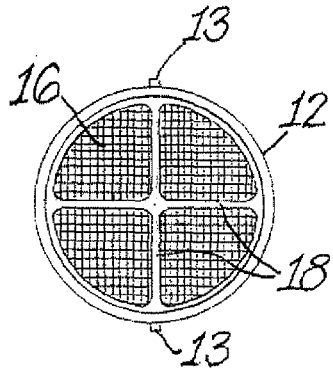
FIG. 7 is a bottom plan view of the lower basket section using the apparatus of FIGS. 1-5.

Rod 15 (FIGS. 1, 3 and 5) attaches securely to the upper section 11 of the container system 10 to permit raising and lowering the container system within the kettle. The container system 10 is designed with a diameter or outer dimension smaller than the internal diameter or dimension of kettle 2 so that the container system can be moved freely up and down and the water or steam is free to flow around the system as it is moved up or down or as the final tea or coffee is poured out of the kettle. Water also can enter or flow through the container which is enclosed for example with a screen-like structure attached to the supporting arms 17 (FIGS. 5 and 6) and supporting arms 18 of FIG. 7 on the upper and lower ends of the container system respectively. Openings in the screens can be adjustable or in any event the individual openings are sufficiently small to contain the tea leaves and coffee grounds yet large enough to allow water to move into and out of the container system. Because the container physically isolates the coffee or tea being extracted, the extracted solid residue held within container system 10 is readily removed from the kettle 2 thus leaving the kettle relatively clean and hence requiring little to no effort to clean it. Multiple brew cycles are possible without cleaning the kettle.

Figure 14:
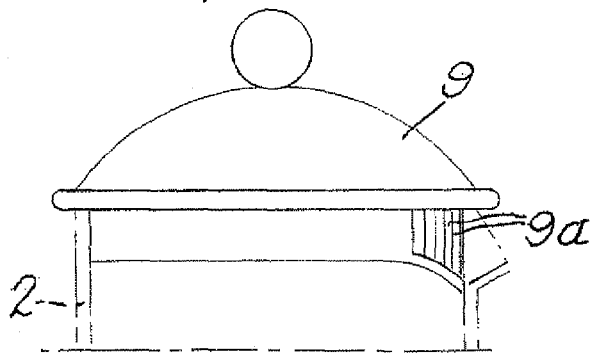
FIG. 14 is a side elevational view of a cover used in the apparatus shown in FIGS. 1-5.

Once the tea or coffee is brewed the container assembly 10 can remain in the water but preferably it will be raised above the water level to stop the extraction. It can of course be removed completely from the kettle and if one wishes a pouring lid 9, (FIG. 14) can be placed on the kettle 2 before the tea or coffee is poured out of the kettle. Slots 9a in the lid allow the lid to be tight fitting yet the beverage can be easily poured out of the kettle with the lid in place.

Critical to producing beverages of optimum flavor is the temperature at which the flavors are extracted and the time of contact with the liquid during extraction. Coffees and teas contain a wide range of organic flavorants. Some of the flavorants are very aromatic, some less. Some components add a bitter taste and are generally to be avoided. The amount of these various flavorants extracted depends on the exact temperature of the water. As the water temperature increases the solubility of each component will change and the rate of extraction increases with temperature. Further the rate of extraction of any component varies with the concentration of that component already in solution. Clearly as the extraction time is increased the concentration of the individual flavorants generally continues, but importantly the ratio of key flavorants is altered sufficiently to be perceptible to anyone with sensitive taste. Consequently the ultimate ratio of flavorants depends on time, temperature, amount of tea or coffee, degree of confinement of the liquid around the tea or coffee and the liquid agitation within the brewing environment. All of these factors must be carefully controlled and clearly if the brewing environment and apparatus allows these variables to be changed by the user, the user will be able to optimize conditions to tailor his beverage to his own taste.

The advanced brewing means disclosed here has the necessary versatility to allow the user to modify the brewing conditions to best match each type of tea or brand of coffee. Thus this novel appliance permits individual but precise control of the brewing temperature and brewing time, while providing the means for preconditioning of the tea of coffee before brewing, and control over agitation during the brewing process.

Figure 9:
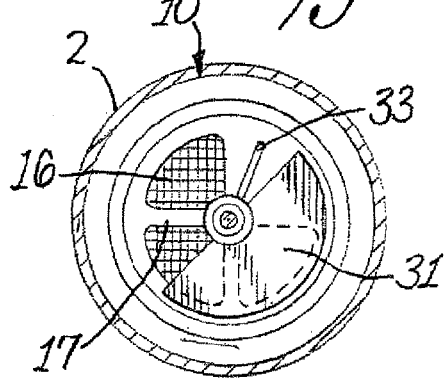
FIG. 9 is a cross-sectional plan view of a portion of the apparatus shown in FIGS. 1-5.

The coffee or tea is placed in a semi-enclosed container whose exterior enclosing surfaces contain a number of small openings to allow water or steam to enter the container during the blooming and during the extraction periods. Commonly a screening type material is used to provide for liquid transfer in and out of the container. The individual openings however are sufficiently small to prevent the ground coffee particles or tea leaves and fragments from passing thru the openings. The number of such openings and the total open area on the surface are important to control the degree of flow or diffusion of liquid and steam into and out of the enclosure. If the open area is large the extraction will result in a flavorant mixture that approaches that obtained by simply pouring the coffee or tea into the heated water. If the total area open for flow of water or steam is small, the conditions and flavor will approach that of a samovar where the tea is confined in only a small volume of water as the extraction occurs. Provision can be made to allow for adjustment of the number of openings or the area of screen in use at any one time. That adjustment can be easily obtained for example by using adjustable close fitting shutters 31 adjacent to the screened area as in FIG. 9, adjusted by a manual means such as lever 33. The degree of adjustment of the open screened area shown in FIG. 9 ranges approximately from 25% to 75% open area. It is more convenient in some models to provide a range of 0 to 100%.

The design of this advanced brewing means offers the user a choice among a variety of alternative brewing processes.

First it is possible to use this in a way similar to a conventional french press which allows him to drop the coffee or tea directly into the heated water, to allow the extraction process to take place around individual particles of coffee or tea leaves surrounded with the large volume of water. The particles drift downward as they wet, then tend to accumulate at the bottom of the kettle and after extraction are mechanically confined by pressing down a screen-like filter tightly conforming to the walls of the chamber to confine the particles at the bottom of the press. They remain there subsequently as the tea or coffee is poured and consumed. Leaving the coffee or tea in the press as the beverage is consumed permits continued extraction of some of the more bitter flavorants adversely affecting the flavor of the beverage. While some users may enjoy the increasingly stronger beverage as the extraction continues over such extended periods, most experts find this detrimental to the flavor or taste. An important improvement, however of the versatile new product disclosed here allows the user to first steam or moisten the coffee or tea which allows the particles to soften and swell (bloom) increasing their total surface area and facilitating better control of the extraction conditions. This new product also permits one to use the novel container, immerse it without agitation at the precisely optimum temperature for an optimum time and to then withdraw it completely from the heated vessel before pouring the beverage. In the other extreme the user can move the container up and down within the water or into and out of the water to obtain maximum extraction of all flavorants in the shortest possible time.

Consequently this novel means provides a variety of reproducible and controlled brewing options allowing the user to optimize the flavor of his coffee, tea or other extractable material to suit his individual preferences.

In order to provide this extreme brewing flexibility this novel apparatus employs, advanced means for controlling the temperature and time with high accuracy, means for compensating for changes in boiling point due to changes in atmospheric pressure, means for keeping the beverage warm after brewing is complete and means in advanced models to automatically initiate the brewing process. These advantages will be clear as the operation of this new product is further described.

Because it may be desired to use this electric kettle simply to boil water for preparation of hot chocolate, soups, etc., protection must be built in to prevent continuous boiling with the possibility of boiling the kettle dry and overheating the unit creating a hazardous situation. Provision is provided in this advanced system to avoid such a possibility while at the same time giving the user the option of setting the water temperature just below boiling such as 211° F. when the actual boiling point at sea level is 212° F. To control the absolute temperature with an accuracy of less than 1° F. is possible but very costly and perhaps impractical for a home appliance. Consequently a novel electronic processor is used to monitor an electronic signal from an incorporated thermal detector in this product to detect the presence of boiling regardless of the temperature at which the water boils depending on the local barometric pressure. The electronic processor simultaneously monitors with aid of a temperature sensor the temperature of the water or of the steam/air mixture just above the water and if the water does boil, the processor retains the precise temperature measurement and notes that as the local boiling point. Subsequently the processor advises the user that he must manually set his desired temperature below that boiling temperature, limits the users ability to set his desired temperature at or above the boiling point, or otherwise prevents this apparatus from continuing to heat the water beyond its local boiling temperature.

This brewing apparatus provides a means for the user to set his desired brewing temperature with great accuracy. For green tea this may even below 150 degrees Fahrenheit while for black tea or coffee he may wish to set the temperature at or just below the boiling point. Other teas and coffees fall generally within this range of temperatures. It is important therefore to sense the water temperature accurately and to display the temperature setting accurately by means of either or mechanical or electrical means. Perhaps the most convenient and accurate means of sensing the water temperature electronically is with either a thermocouple precision thermistor or other means in excellent thermal contact with the water or contacting a highly thermally conductive thin material separating the sensor from the heated water. Because of the high thermal conductivity of the metal heater plate in contact with the heating water the dry side of the heater plate provides a convenient and practical place to monitor the water temperature. That plate can alternatively be provided with a thin walled thermal well, protruding into the liquid, in which to mount a thermistor or thermocouple. Alternatively the sensor can be mounted on an internal wall of the kettle to achieve even greater thermal accuracy.

An electrical heater for the water is mounted on a metal plate, for example made of steel or aluminum, one side of which is in good thermal contact with the water in the kettle. The heater must provide a large amount of power in order to heat the water quickly but substantially less power is required to maintain the heated water and kettle once the desired temperature is reached. Consequently it is desirable to have a high wattage heater for example in the range of 1000-1500 watts to heat the water quickly. Once the water is heated to the control temperature not more than about 100 to 200 watts is needed to maintain it there. This novel brewing apparatus uses a single high wattage heater to permit rapid heat up of the water but incorporates an electronic controller that regulates the intermittent flow of electrical power applied to that same large power heater as a means of reducing the effective wattage of the large heater during the keep warm cycle. This unique means avoids the need for two heaters of different wattage, inefficient and expensive resistors, conventional relays, or mechanical thermostats. The controller thus sends short-time bursts of fill power to the large heater at just the correct frequency and duration to maintain the water at precisely the desired temperature. Commonly the controller sends many pulses each second. The effective wattage required will of course be larger if there is more water in the kettle or if the water is maintained at a higher temperature than if the water is closer to room temperature.

This novel brewing apparatus also includes means to keep the beverage warm after the brewing cycle is complete. The electronic processor 47 is programmed to adjust automatically in response to the thermal sensor 27 the frequency and duration of electrical power pulses applied to the heater 19 to maintain the beverage at a preselected temperature such as 160° C. Controls are provided to enable the user to change this "keep-warm" temperature in order to provide a cooler or warmer beverage. This advanced means of varying the wattage of the heater insures that just the correct amount of energy is applied to the heater and kettle. Excessive power is never applied to the heater. Consequently and importantly unlike conventional heating means the temperature s of the heater plate 3 is never heated in the "keep-warm" mode to more than a few degrees above the average temperature of the beverage in the kettle, thus avoiding overheating the beverage and adversely affecting its temperature.

It is important to minimize the amount of energy required to "keep-warm" the beverage in order to minimize any modification of the optimum flavor of the beverage. Any heating implies some differential in temperature between the heating source such as the heating plate and the liquid. To further reduce that differential temperature, it is desirable to reduce heat loss from the kettle, especially during the "keep-warm" period which may be well in excess of an hour. A convenient way to reduce such losses is to use an insulating double walled kettle 2 preferably with a good vacuum in the inner space between the double walls. Conventional thermal insulating materials can also be used around the kettle to reduce the heat loss. Another novel means is an electrically heated blanket or a circular flexible or rigid heated enclosure maintained at the "keep warm" temperature, conforming closely to the exterior of the kettle. Such warmed means that surround the large area of kettle walls require a vanishingly small temperature differential between the heated blanket and kettle to maintain the beverage at the "keep-warm" temperature.

The signal generated by the temperature sensor, proportional to the water temperature is fed to an electronic processor and the signal from a means to set the temperature level selected by the user is likewise fed to the processor The processor compares these two signals and directs the controller to apply the appropriate amount of power to the heater to either heat the water rapidly or to apply a lesser amount of heat just enough to maintain the temperature at the set temperature.

The processor uses modern solid state integrated chip technology to handle electronic inputs, to manipulate and compare input signals, to make the logic decisions, to convert analog signals from sensors to digital form, to make necessary calculations and to direct the controller regarding the appropriate power that must be applied to the heating s elements. The controller can adjust the power to the heater either by use of electrically actuated mechanical relays, by means of solid state Triacs™, thyristors, solid state relays and can employ time based pulse width modulation methods for controlling the amount of power transferred.

This brewing device will preferably have an electronic display conveniently accessible to the user to display the set temperature (the desired brewing temperature) with manually operated control buttons that allow the user to set the temperature higher or lower. A conventional LED (light emitting diode) or LCD (liquid crystal device) can be used to display conventionally the set water brewing temperature or the same display can be directed to read-out the actual water temperature. This same display can be used also to display brewing time and to display "remaining brewing time" to indicate and advise the user as the brewing proceeds and ends. When the brewing cycle ends visual and/or audible indications or alarms can be made to advise the user that the beverage is ready for consumption.

In normal operation the user will preselect the desired brewing temperature and brewing time using the provided control buttons. The average user will not find it necessary to change either brewing time or temperature very often once he optimizes his preferred operating parameters. However, the controls are sufficiently flexible to allow the user to easily experiment and to change these parameters until the optimum is realized. Some models can memorize and store several different programs found by the user to be optimum for different teas or coffees. It is then a simple matter for the user to select stored programs depending on the special tea or coffee being brewed at a given time. The controls are sufficiently flexible to allow the user if he wishes to defeat the timing function and to control the timing by other means.

Figure 10:
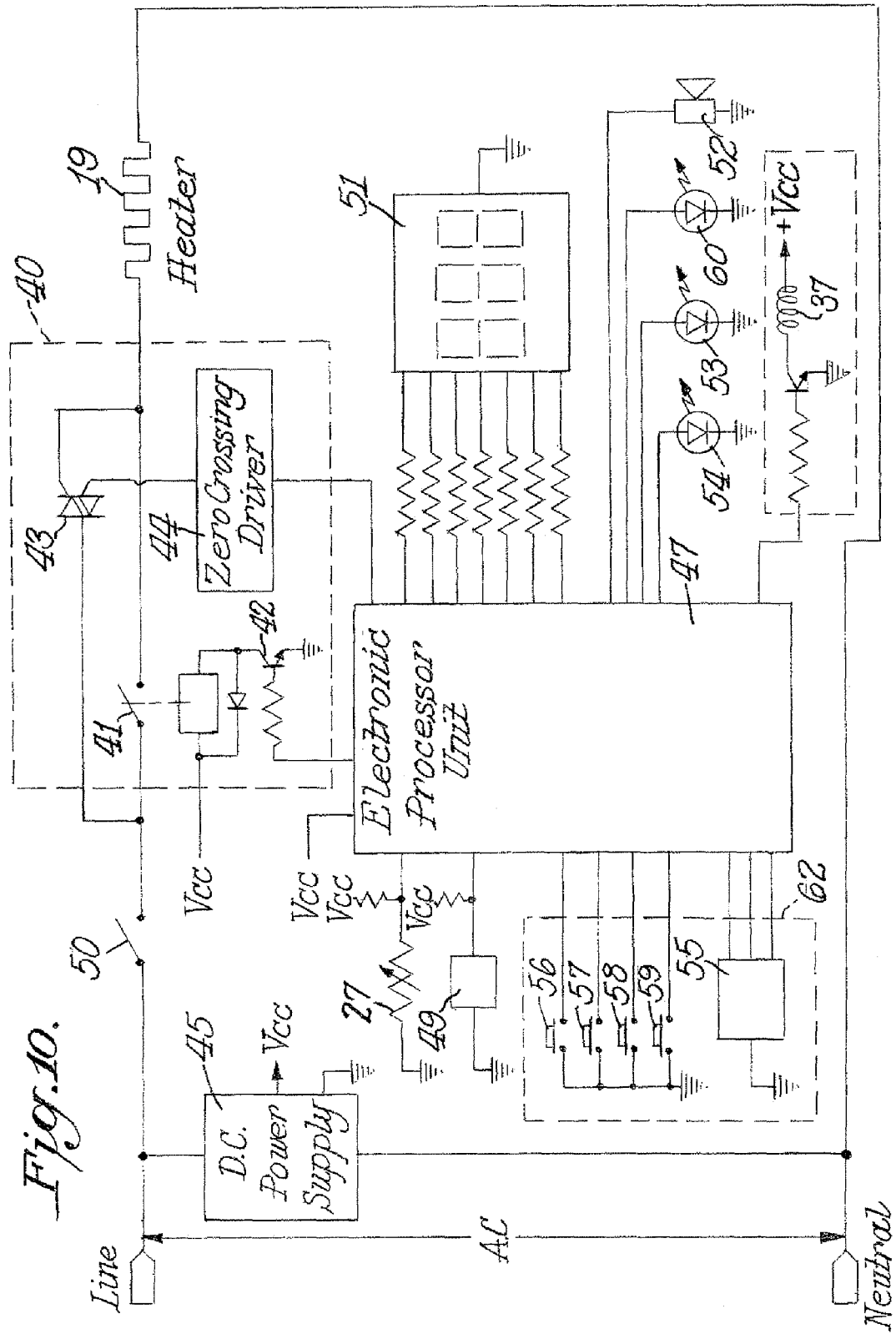
FIG. 10 is a circuit diagram for the apparatus shown in FIGS. 1-5.

FIG. 10 is an electrical diagram of the basic operating components. Initially the processor 47 has factory set default values stored for brewing time and temperature. If the user chooses to change brewing time, the time input button 56 is pressed and the display 51 will show the time set. The user can then use the increment button 58 or decrement button 59 to change the default time setting. Similarly, the user may press the brewing temperature-input button 57 and then using the same increment 58 or decrement 59 buttons to change default temperature setting. The processor 47 will store these values for the next use. When the kettle is used again, the modified values will be loaded even if the kettle has been turned off and power removed. The multifunction switch 55 is a user input device which allows the user to select the mode for the kettle to operate. It can of course be several switches. The commonly preferred functions are, but not limited to, OFF, HEAT and BREW. When the multifunction switch 55 is actuated to the "HEAT" position, the processor 47 will activate the heater controller 40 in the following manner: first transistor 42 will be activated which in turn energizes relay 41 to apply fill power to heater 19. The processor will then compare output from temperature sensor 27 with set temperature and when sensor 27 output reaches set temperature, the processor 47 will deactivate transistor 42 and relay 41 and activate triac 43 through zero crossing driver 44. This triac 43 is activated and deactivated many times each second in a time based pulse width modulation manner in order to reduce the effective wattage to the heater 19 to only that sufficient to maintain set temperature. With this novel method the minimum time is required to bring the water up to the set temperature by using, for example, full 1500-watts, then more accurate control is utilized to maintain water temperature within a tight tolerance using less wattage. The zero crossing driver 44 senses the location of the AC sine wave voltage and only activates the triac 43 when there is a zero voltage condition thereby reducing inrush current and eliminating radiated interference.

While heating in full power mode, LED 53 will be activated by processor 47. When set temperature is reached LED 54 and/or audible signal device 52 will be activated by processor 47. Microprocessor can also activate container release mechanism 35, FIG. 12, thereby lowering container into water or alternately user may lower container manually and switch multifunction switch 55 to "Brew". At this time, a timer internal to processor 47 will begin counting down from set time and processor 47 will output time remaining to display 51. Also at this time, the processor 47 will command heater controller 40 to reduce wattage further thereby slowly lowering the temperature of the water until it reaches a keep warm temperature suitable for consumption and then maintain that temperature. This temperature has a factory default setting in the processor 47 and can be changed by the user by pressing a combination of buttons. When time reaches "00" the processor will activate LED 60 indicating brew is done and momentarily or periodically activate audible signal device 61. If at any time the steam detector 49 or thermal sensor 27 outputs to processor 47 an electrical signal indicating the presence of steam, the processor 47 will reduce the maximum temperature set point, and thereby reducing water temperature in the future so that no steam is detected. Because this condition may occur at higher altitude locations, this lowered setting will be stored by processor 47 and used for future settings.

The processor 47 also analyzes the rate of rise from the temperature sensor 27 and can determine the point of boiling by sensing a significant decrease in the rate of temperature rise, and will likewise reduce settings appropriately If the user attempts to increment set temperature above this stored temperature, the display 51 will display "Boil". Pressing a combination of buttons and holding for 3 seconds can restore all factory default settings. If kettle is left unattended with no user input for an extended period such as for 2 hours, processor 47 will deactivate heater controller 40 thereby turning off heater. Any user input will restore normal use.

If kettle is operated with no water, processor 47 will determine from sensor 27 that temperature is above normal operation and will deactivate heater. In the event of any component failure which would result in excess temperature of heater 19, boil dry safety switch 50 will interrupt AC power to heater controller 40 thereby deactivating heater 19 until temperature restores to normal.

Figure 12:
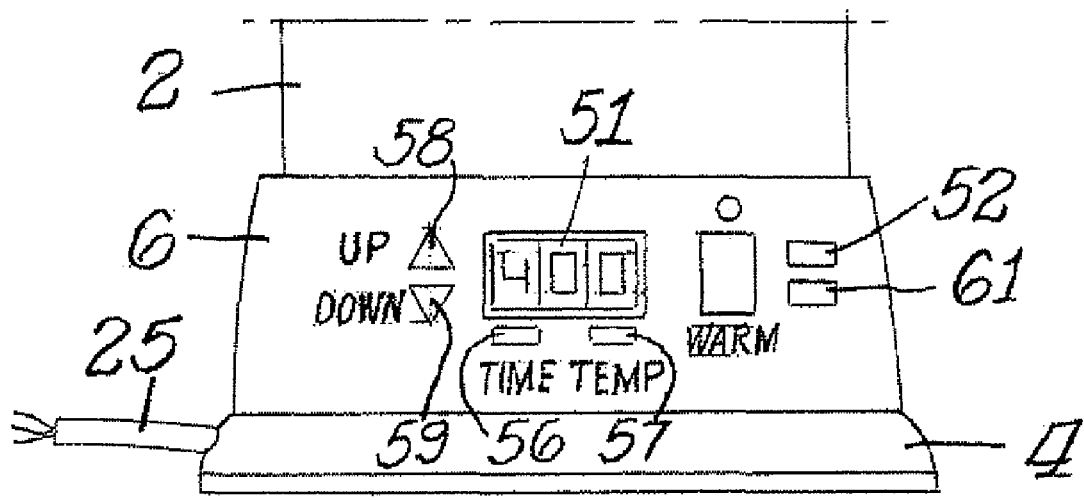
FIG. 12 is a side elevational view of a portion of the apparatus shown in FIGS. 1-5.

One physical layout of the controls and displays is shown in FIG. 12. As shown in FIG. 1, the controls are in part on the handle of the kettle for convenience and the balance are on the base enclosure 6.

In normal use the user preferably preprograms his preferred brewing time and temperature. The processor remembers these settings. In any event the user first programs time and temperature, fills the kettle with water to the desired level and places the correct quantity of coffee or tea inside the brewing container. He will likely not want to immerse the container but rather holds it above the water level while the water heats up to the set temperature level. When that temperature is reached the processor and controller maintain the water in the kettle at the set temperature until the user is ready to start the brewing process. When the user wishes, he then actuates a brewing switch button and lowers the container with the coffee or tea below the water surface to allow the extraction process to begin. Power to the heater is normally turned off at the beginning of the brewing cycle, but as explained later the heating may continue for a limited time. The timer starts counting down and at the end of the preset brewing time an audible alarm and/or light indicates that the brewing time has ended. The user then will likely want to raise the container above the liquid level or remove it completely from the water kettle. The beverage is then ready to serve.

Because of the flexibility provided the user can select the optimum time and temperature for brewing. He can elect to either place the container with tea and coffee into the kettle above the water during the heat-up and steaming period to allow the tea or coffee to bloom or he can elect to place the tea and coffee in the container only after the water is at temperature and ready to brew. The user can adjust the amount of tea and coffee used and this novel means allows the user to adjust the effective open-area of the container walls and thereby affect the flow of water in and out of the container during the brewing cycle. During the brewing cycle the user can increase the flow through the container simply by alternately raising and lowering the container within the liquid or in and out of the liquid as the brewing proceeds.

If the user wishes to brew at any set temperature but particularly at a temperature at or very close to the local boiling point of water, the processor will direct the controller to apply full or virtually fill power to the heater in order to heat the water quickly to that set temperature. Just before the temperature reaches the set temperature the processor will normally direct the controller system to reduce power to a lower level in order to either reduce the opportunity for boiling or to approach the set temperature more slowly and with greater temperature accuracy, thus avoiding temperature overshoot. This insures rapid heat-up and temperature accuracy. If, however the user sets the temperature above the local boiling temperature, a boiling detector or temperature sensor located at the top of the kettle in the steam zone, in the liquid, or otherwise in close thermal contact with the liquid and/or steam alerts the processor to read and record the temperature at which the boiling occurred. Then in the subsequent use the processor and display alerts the user that his setting is above the boiling point and prevents him from setting the temperature above the boiling point. The boiling detector can be, for example a thermistor that senses a leveling off of the rise of liquid temperature of the steam/air mixture, a moisture sensitive resistor or, for example, a thermally sensitive switch based on a thermally sensitive bimetallic material appropriately located to detect the liquid or steam temperature. To sense the leveling of the liquid or vapor temperature rise and hence boiling during the heating cycle one can use an electronic processor that analyzes the rate of rise of the liquid or steam/air and senses the moment that the temperature no longer rises.

Electronic means can be incorporated to detect power failures and to switch off the power and to alert the user to restart the unit when power is restored. Any of a variety of audible and/or visual alarms can be used to alert the user to the fact that the water is still heating, that the water temperature is ready to start brewing, or that the brewing cycle is complete.

Figure 13:
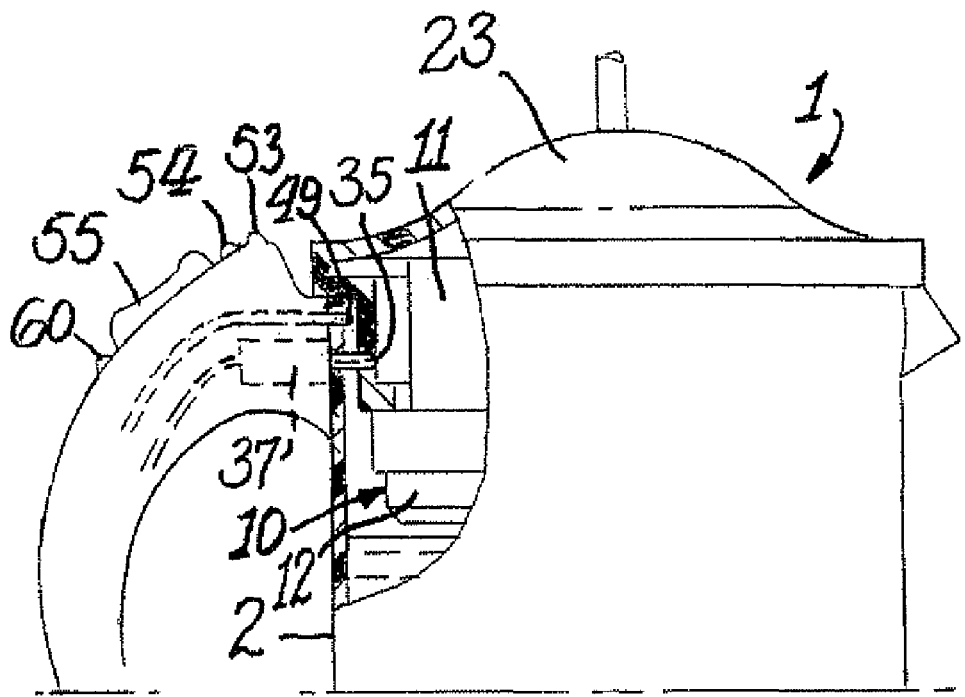
FIG. 13 is a side elevational view partly in section of a portion of the apparatus shown in FIGS. 1-5.

An automated version of this improved brewing means incorporates an electrically actuated "holder" of the container that holds the loaded container above the water level s until the water is at the desired brewing temperature. At that temperature the electronic processor directs the electrically actuated holder to release the basket and allows it to drop and immerse into the liquid appropriately. The brewing timer alerts the user when the brewing time is complete to advise him that it is time to raise the container above the liquid, and if desired to remove the container reflecting the fact that the beverage is ready to pour. The electrically actuated "holder" can be an electromagnetically actuated solenoid 37 that moves a rod or lever 35, FIG. 13 to hold and subsequently release the container. Alternatively an electromagnet can be used to attract and hold to it a metal ferromagnetic structural part of the container.

FIGS. 15-16 show further embodiments of this invention which are intended to maintain the liquid contents at their desired temperature. As shown in FIG. 15 the kettle 1A includes an outerjacket 80 completely around the vessel 2. The space 82 between the jacket 80 and the vessel 2 is evacuated so as to provide an insulation around the vessel 2.

FIG. 16 shows a variation where the kettle 1B has a foam jacket or sleeve 84 disposed around and against the shell vessel 2. The foam sleeve includes electrical wiring 86 which would be connected by wires 88 to processor 47 for heating the sleeve 84 and thereby maintaining the temperature of the liquid within vessel 2. Sleeve 84 could be permanently mounted around vessel 2. Alternatively, the insulation to maintain the temperature of the liquid in vessel 2 could be achieved wherein a sleeve such as sleeve 84 is made of a heat retaining material as is generally known and could be permanently or detachably mounted around vessel 2 without the provision of electrical wiring 86 for heating the sleeve.

An important advantage of this new brewing kettle, is that the processor can be programmed to either hold the temperature at the set temperature for a predetermined portion of the brewing time, to heat only until the temperature equilibrates, or to heat for the entire brewing cycle. The actual brewing temperature generally will drop slightly when the container is immersed in the heated water. Clearly it is preferable in any event to use less than full heater power for any heating once the brewing begins in order to avoid any possible overheating of the liquid and the extracted flavorants. By holding the temperature relatively constant during the brewing cycle, the extraction process is optimized, the time can be reduced, and the flavor enhanced. Flavorants, however can be oxidized by direct contact with the heater plate and hence the heater plate must not be excessively hotter than the brewing water.

By designing the advanced electric brewing kettle described here with a circular wall configuration it is possible for this advanced brewing means to be used with a separate close fitting flexible screen like those used in a french press that can be alternatively attached to control rod 15 where the coffee/tea container 10 is normally attached. By this means the versatility of the product is increased and the need for a separate french press is eliminated for the average household.

The advanced heated brewing kettles as described herein are designed to be quite versatile, including simply boiling water. Hence they can be used to prepare and dispense heated water of preselected temperature, up to the boiling point, that can be used conveniently for a variety of other purposes outside the kettle, such as for brewing individual cups of coffee or tea, or for making soups, hot chocolate, etc. In any use of the water kettle it is important to be able to avoid unwanted or excessive boiling of the water which as discussed herein can lead to boiling the kettle dry. That is wasteful of water and energy and if done repeatedly, selected components of the kettle can overheat excessively and be damaged. It is important therefore that the kettle contain a temperature sensor and a signal processor as described to determine the rate of rise of the water temperature, for example to detect the instant that the water reaches boiling temperature or to determine the water level in the kettle and to be designed to take an appropriate action whatever it may be in a particular use, such as reducing the amount of power to the heater, turning off the power to the heater and/or the kettle, or turning on a lower powered heater to maintain a slowly boiling condition, etc.

Figure 11:
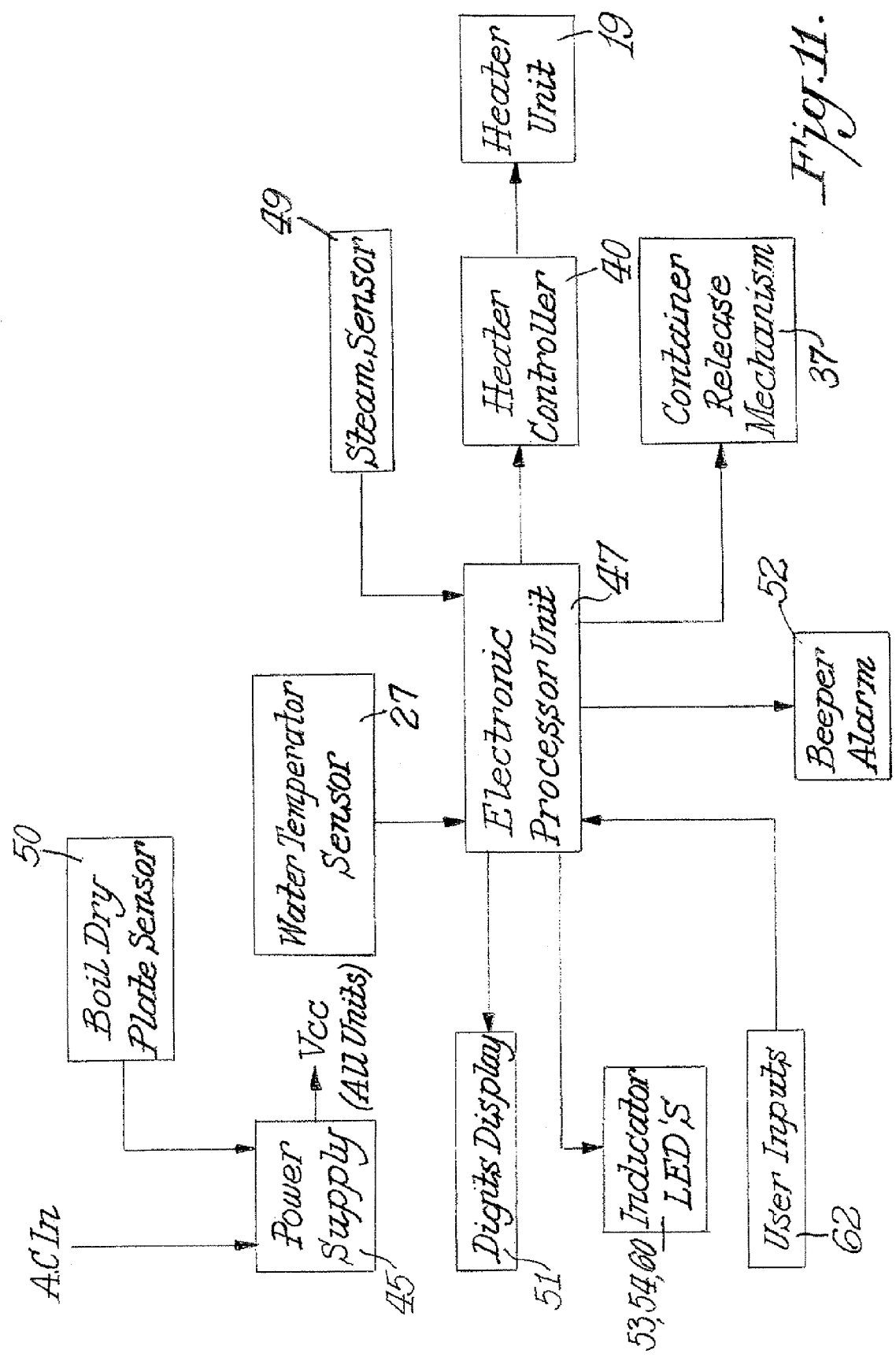
FIG. 11 is a block diagram showing the relationship of the various components of the apparatus shown in FIGS. 1-5.

The electronic components needed to monitor water temperature and utilize the rate-of-rise of water temperature as a means for example to establish the onset of boiling of a water kettle can take on a variety of configurations as discussed herein but the functions involved can be readily understood. The water temperature can be sensed for example by a thermocouple that generates an electrical voltage that can be directly correlated with the temperature of the thermocouple. Another example is a thermistor which is a form of electrical resistor whose resistance relates directly to the temperature of the thermistor. There are many other temperature sensing components (sensors) that have a physical or electrical property which if monitored can serve as a direct indication of the temperature of that sensor. As illustrated in FIG. 11, the sensor of water temperature 27 is connected electrically to an electronic processor 47 which can generate an electrical signal related to that varying parameter of the sensor, such as the sensor's output voltage or its electrical resistance. The processor has the ability as necessary to process that resulting signal data including appropriate computing ability and ability to store and manipulate that signal data. Likewise it does have the ability to analyze the data and take action depending on the flow of data. The electronic processor is designed then to pass instructions electronically to a heater controller element or unit which in turn controls the amount of electrical energy delivered to the water heater. Physically the electronic processor and the heater controller may be located separated or mounted on the same circuit board.

As described earlier herein, for the greatest accuracy, the temperature sensor must be in good thermal contact with the water. Ideally the sensor would be immersed in the water. That is however not necessary if the sensor is in good thermal contact with a heat conducting material which is in good thermal contact with the water. For example, as described earlier the sensor could be in contact with the metal kettle itself or the sensor could be located in thermal contact with a thermal well such as a cup shaped or thimble shaped structure largely surrounded by the heated water. Such structures are widely used and well known to those skillful in thermal measurements. Steps can be taken also to thermally insulate the sensor sufficiently from other sources of heat that could otherwise affect the accuracy or reproducibility of the sensor. For example the sensor can be insulated from the water heater by using a thermally insulating support for the thermal well or by using intervening physical structures that will dissipate much of the heat coming from such other sources (such as the water heater) by their exposure and heat transfer to the intervening ambient air or to the water itself. By such known techniques the sensor can be optimally located and protected so that its temperature depends principally upon the temperature of the water. The temperature of the sensor can by these means track closely the temperature of the water and any small difference in their absolute temperatures can be determined and appropriately corrected for by the electronic processor. Importantly if operating decisions are to be made based solely on the rate of temperature change it is not always of importance to know the actual temperatures involved. The rate of temperature rise is an accurate indication of boiling because the rate of rise will go to zero as the boiling begins. That is independent of actual temperature and that characteristic of boiling is fundamentally true independent of whether the kettle is full or almost empty. The actual temperature at which this occurs is however related directly to the ambient atmosphere pressure at the kettle location.

When the rate of rise goes to or approaches zero it is desirable to either reduce or turn off the power to the heater depending on the desire of the user. Reducing the power to the heater could allow the water to remain at boiling temperature but boil less vigorously, until it is used. Alternatively the power to the heater could be shut off and the water allowed to cool. The latter can be very important when water levels in the kettle are low, in order to prevent a boil-dry situation which, if repeated frequently can damage the kettle.

The rate of rise of water temperature in a heating kettle is of course a direct indication of the amount of water in the kettle. For example if the power to the water heater remains unchanged the water temperature will rise slower when the heating kettle is full of water and faster when it is nearly empty. For example, with a heater of 1500 watts a kettle of 1 liter capacity might heat the water from room temperature to boiling at a rate of about 80° centigrade in 4 minutes representing an average rate of temperature rise of 20° C. per minute. But if the kettle had only 0.1 liter of water in it, the water would boil much faster in about ½ minute or so, representing an average rate of temperature rise perhaps as high as 160° C. per minute. A thermal sensor and a processor will easily detect this very large difference in rate and rise of water temperature and can use this rate of rise to determine the amount of water in the kettle. If the water level is considered too low for safety or other reasons that information can be used to shut off the power promptly to the heater and avoid a boil dry situation that could damage the kettle. Alternatively the power can be reduced automatically and appropriately to a keep - warm condition, say for about 5 minutes and then to turn off the power to avoid a boil dry situation. Thus the measurement of rate of rise of the water temperature is a particularly useful function to control the safe operation of the kettle and to carry out the user's desires and instructions regarding the temperature of the water and how it is used for brewing or other purposes. Clearly the electronics can be provided to compute the first derivative of the rate of rise which is a specific indication of how fast the rate of rise is changing. The derivative separates periods where there is a constant rate of change from periods where the rate of rise is changing more rapidly as when boiling is approaching. Sometimes the derivative provides a convenient and more obvious indication that some action needs to be taken by the processor.

Consequently in the described kettle the processor/controller if appropriately programmed can utilize the measured rate of rise of water temperature or the mathematical derivative of that (which is rate of change with time of the rate of rise of temperature) to make decisions and to adjust the power to the heater or to the entire kettle depending on the current operating condition of the kettle. The processor/controller can confirm that the kettle is operating according to the users instructions and take no action, or it can conclude that a change in power is needed at a particular moment to carry out the users' instructions. Further it can conclude that the condition in the kettle is starting to deviate from the users instructions or that the user has overlooked the fact that there is s inadequate water in the kettle and that the kettle is in danger of boiling dry, a situation that would cause the processor/controller to reduce the power to the heater, shut off the power to the kettle, or notify the user by a sound, light, or display on the control panel an adjustment must be made to the controls or power. These operating alternatives are all within the described function of the processor with the controller.

Thus the kettle can be used to boil water and to hold the water at that temperature using just enough power to sustain a slow boil. It can likewise be programmed to detect the boiling temperature and then allow the water to cool just a few degrees below boiling and to hold the water at that temperature close to but not actually boiling.

The power delivered to the heater can be varied as by the processor/controller described herein by using either an electromagnetic relay at higher power levels or using a time modulated pulse width technique to control lower amounts of power very precisely, or by using both, with more than one heater. The electronic processor/controller can as described process the signal from the temperature sensor to determine the rate of change of the water temperature at all times and the processor's computer can compare that actual rate of change at that moment in time with the expected rate of change as a means to determine if the water temperature is changing as expected for under normal operation. The smart processor/controller described herein can as a consequence sense when there is a deviation from normal operation and promptly take a remedial action such as turning off power to the kettle or to the water heater and an error message can be displayed on the control panel of the kettle to alert the user that there is a problem.

It should be noted that the rate of rise of water temperature can be either a positive or negative rate of rise depending on the operating conditions in the kettle at any given moment in time. Thus, the rate of rise might also be considered as a rate of change. The present invention includes utilizing the rate of rise or rate of change for various advantageous purposes.

The rate of change of water temperature during any period while heating the water and during the following period when the heated water is cooling (after heater shuts off) can be used to accurately determine the water level in the kettle and as an indication of an improper operating condition such as there is no lid on the kettle.

Tests on actual kettles have shown that the rate of change of water temperature during its cooling period following shut off of the water heater at elevated water temperatures is highly sensitive to whether the lid of the kettle is open or closed. Likewise, the rate of temperature rise of the water when heating is highly dependent on the amount of water in the kettle and hence dependent on the water level. Consequently these rates of temperature change can be used to determine the actual water level in a given kettle with a heater of known and constant wattage or to alert the user to close the kettle lid if it is inadvertently left open.

The successful use of rate of temperature change to control the operation of heated water kettles or to monitor for abnormal and unsafe situations, can be optimized by detailed knowledge of the characteristics of each style kettle. Consideration must be given to the wattage being delivered to the heater or heaters, and the rates of heating and cooling as influenced by the conductive, radiant and convective thermal losses, steam or vapor losses from the kettle, ambient temperature, etc. It is possible, for example, for the electronic processor/controller to determine the water level by the rate of temperature rise while the water is being heated, then knowing that level the rate of temperature change during cooling (with the heater off) will be direct indicator of whether the kettle lid is open or closed. The effect of all of these variables can be established for a single class of kettles or determined on individual kettles by direct measurements of water temperature as it is heated and cooled and interpreted by the electronic processor of each individual kettle.

What is claimed is:

1. An electrically powered heated kettle comprising an unsealed vessel for holding a vaporizable liquid, a heater capable of heating the liquid in said vessel to the boiling point of the liquid at the prevailing atmospheric pressure, an electrical heater controller to adjust the amount of power delivered to said heater, an electronic signal processor to direct said controller to adjust the amount of electrical power to said heater, an electrical sensor located to generate an electrical signal that varies predictably with the temperature of the liquid or the air/vapor mixture directly adjacent the liquid in said vessel as the liquid is heated by said heater to the boiling point, and to transmit said signal to said electrical signal processor, whereby said processor can determine the instant in time that the rate of rise of liquid temperature essentially goes to zero and can therefore establish that the liquid is boiling and direct said controller to reduce the amount of electrical power delivered to said heater.

2. An electrically powered heated kettle according to claim 1 where said controller reduces the amount of electrical power delivered to said heater in order to reduce or terminate boiling of the liquid.

3. An electrically powered heated kettle according to claim 1 including at least one manually actuated control to preset the desired liquid temperature or other operating parameters for said electronic signal processor and controller.

4. An electrically powered heated kettle according to claim 1 where said processor can store said signal or value representing the temperature of the liquid boiling point.

5. An electrically heated water kettle comprising an electrical heater, a heater controller, a thermal sensor located to generate a signal predictably responsive to the temperature of the water or its vapor, an associated electronic processor to monitor the signal output of said sensor while the water is being heated and to sense the rate of rise of that output signal indicative of water temperature to detect the instant in time that the rate of rise of water temperature goes essentially to zero, which the electronic processor can identify as the beginning of boiling at the local atmospheric pressure and direct the heater controller to reduce the electrical power applied to the heater.

6. An electrically heated water kettle for holding water comprising at least one heater of the water, a controller to adjust the amount of heat applied to the water, a thermal detector with a parameter that is predictably responsive to the temperature of the water or its vapor, an electronic processor to monitor that responsive parameter as the water is heated and to determine the rate of change of that parameter in order to establish the instant in time that the rate of temperature rise goes to zero as an indication of the beginning of water boiling at the local atmospheric pressure and to then cause said controller to reduce the electrical power applied to said at least one heater.

7. An electrically powered heated water kettle comprising a heater for the water, a temperature sensor mounted in thermal contact with one of the water and the kettle to create a signal directly correlatable with the water temperature in the kettle, an electrical processor/controller to receive said signal from the sensor to determine the rate of rise of said signal and to control power function selected from the group consisting of turning off, and adjusting the amount of power delivered to said heater when the rate of change of the water temperature reaches a predetermined rate.

8. An electrically powered heated water kettle to claim 7 where the processor/controller controls the power function when the rate of rise of the water temperature signal approaches zero indicating the water is boiling.

9. An electrically powered heated water kettle according to claim 7 where the processor/controller turns off or reduces the amount of power delivered to said heater when the rate of rise of the water temperature signal becomes higher than a predetermined rate indicating the water level in the kettle is too low or the kettle is in the process of boiling dry.

10. An electrically powered heated water kettle comprising a heater for the water, a temperature sensor mounted in thermal contact with one of the water, the vapor space and the kettle to create a signal directly correlatable with the temperature of the water in the kettle, and an electrical processor/controller to receive said signal from said sensor to monitor the rate of change of that signal and to adjust the amount of power delivered to the heater in accordance with the measured rate of temperature change or according to the change in that rate.

11. An electrically powered heated water kettle according to claim 10 where the processor/controller appropriately adjusts the power to the heater when the rate of water temperature change or when the rate of change of that rate indicates that the water is at or approaching boiling or that an abnormal or potentially unsafe operating condition exists.

12. An electrically powered heated water kettle according to claim 11 where the potentially unsafe condition is that the water is boiling and that the kettle is in danger of boiling dry.

13. An electrically powered heated water kettle according to claim 11 where the abnormal operating condition is insufficient or no water in the kettle and the kettle is in danger of boiling dry.

14. An electrically powered heated water kettle comprising a heater for the water, a temperature sensor mounted in thermal contact with one of the water, the vapor space and the kettle to create a signal directly related to the water in the kettle, an electrical processor/controller that receives said signal from the sensor and controls the amount of power delivered to the heater in accordance with the users control settings and the measured rate of temperature change of the water and reduces the amount of power to the heater if the rate of change of water temperature is abnormal indicating the kettle is dry or in the process of boiling dry.

15. An electrically powered heated water kettle comprising a heater for the water, a temperature sensor mounted in thermal contact with the water, the vapor space of kettle to create a signal directly correlatable with the temperature of water in the kettle, an electrical processor/controller to receive said signal from the sensor to monitor the rate of change of that signal with time and to adjust the amount of power delivered to the heater in accordance with the measured rate of temperature change with time or according to the change of that rate with time.

16. An electrically powered heater water kettle according to claim 15 where the processor/controller monitors the rate of change of the water temperature with time to determine during periods of water heating and cooling the amount of water in the kettle, to determine the presence of operational abnormalities, and at all times based on these determinations to adjust operating parameters to optimize kettle performance or to correct operational abnormalities.

17. An electrically powered heated kettle according to claim 15 where the processor/controller monitors the rate of change of the water temperature with time to determine during periods of water heating and cooling the amount of water in the kettle, to determine the presence of operational abnormalities and at all times based on these determinations can actuate displays or otherwise signal the user to take appropriate action that will optimize, modify, or correct the kettle performance.

18. An electrically powered heated water kettle comprising a heater for the water, a temperature sensor mounted in thermal contact with the water, the vapor space or kettle to create a signal directly correlatable with the temperature of the water in the kettle, an electrical processor/controller to receive such signal from the sensor to monitor the rate of change of that signal when the water is being heated by said heater and when the water is allowed to cool with no power applied to the heater and to determine from the rates of change the actual amount of water in the kettle and whether the kettle lid is closed.

19. An electrically powered heated water kettle comprising a heater for the water, a temperature sensor mounted in thermal contact with the water, the vapor space or kettle to create a signal directly correlatable with the temperature of the water in the kettle, an electrical processor/controller to receive said signal from the sensor to monitor the rate of change of that signal with time and to adjust the amount of power delivered to the heater in accordance with the measured rate of temperature change with time or according to the change of the rate with time.

20. An electrically powered heated water kettle according to claim 19 where said electrical processor/controller can store said signal, compute the rate of change of said signal to determine the instant in time when the rate of rise of the water temperature goes to zero and can therefore establish that the liquid is boiling and can at that time reduce the amount of electrical power delivered to the heater.

21. An electrical powered water kettle according to claim 19 comprising at least one water heater.

22. An electrical powered water kettle according to claim 19 which also comprises a manually actuated control that can be set by the user to a desired water temperature where said processor/controller can monitor the signal from said sensor and reduce the power to said heater as the water temperature approaches said desired water temperature.

23. An electrically powered heated water kettle according to claim 19 where the processor/controller appropriately adjusts the power to the heater when the rate of water temperature change or when the rate of change of that rate indicates that the water is at or approaching boiling or that an abnormal or potentially unsafe operating condition exists.

24. An electrically powered heated water kettle according to claim 23 where the potentially unsafe condition is that the water is boiling and that the kettle is in danger of boiling dry.

25. An electrically powered heated water kettle according to claim 23 where the abnormal operating condition is an inadequate amount of water or no water in the kettle and the kettle is in danger of boiling dry.

26. An electrically powered heated water kettle according to claim 19 where the processor/controller can store the received signals from the sensor, determine the rate of change of the water temperature with time and make appropriate adjustments to the amount of power delivered to the heater or kettle.

27. An electrically powered heated water kettle according to claim 26 where the processor/controller establishes and stores the temperature at which water boils at the local atmospheric pressure, and controls power to the heater at subsequent time to prevent the water from boiling.

28. An electrically powered heated water kettle according to claim 19 comprising an electrically powered visual display to indicate the water level in the kettle where the processor/controller determines the rate of change of the water temperature as the temperature is rising, uses that rate to compute the level or amount of water in the kettle and transmits that information to the visual display.

29. An electrically powered heated water kettle comprising a heater for the water, a temperature sensor mounted in thermal contact with one of the water and the kettle to create a signal directly correlatable with the water temperature in the kettle, and an electrical processor/controller to receive said signal from the sensor to determine the rate of rise of said signal and to turn on a lower powered heater or to reduce power to maintain a slowly boiling condition.

* * * * *